United States Patent [19]

Rogers

[11] Patent Number: 4,505,669
[45] Date of Patent: Mar. 19, 1985

[54] LIQUEFYING HOT MELT ADHESIVE

[75] Inventor: John Rogers, Nuneaton, England

[73] Assignee: Dynamelt Limited, Daventry, England

[21] Appl. No.: 466,082

[22] Filed: Feb. 14, 1983

[30] Foreign Application Priority Data

Feb. 15, 1982 [GB] United Kingdom ............... 8204305

[51] Int. Cl.³ .................. F27B 14/00; E01C 19/45
[52] U.S. Cl. ................. 432/13; 126/343.5 A; 219/420; 432/210
[58] Field of Search ................. 432/13, 210; 126/343.5 R, 343.5 A; 219/420

[56] References Cited

U.S. PATENT DOCUMENTS

| 2,358,624 | 9/1944 | Burry ............................ 126/343.5 A |
| 4,024,854 | 5/1977 | Park et al. ..................... 126/343.5 A |
| 4,074,707 | 2/1978 | Perelman ....................... 126/343.5 A |
| 4,308,447 | 12/1981 | Notzold et al. ................. 432/210 |
| 4,383,821 | 5/1983 | Campbell ........................ 126/343.5 R |

FOREIGN PATENT DOCUMENTS 478208 6/1929 Fed. Rep. of Germany ... 126/343.5 A

Primary Examiner—John J. Camby
Attorney, Agent, or Firm—Scrivener Clarke Scrivener and Johnson

[57] ABSTRACT

For liquefying hot melt adhesive, a hopper is provided at its lower region with one or more discrete upwards projections (for example a single, fluted cone), with means for heating the projection(s). In use, a unitary mass of hot melt adhesive is lowered into the hopper to become supported on the projection(s), as a result of which the unitary mass is progressively melted and the melted adhesive flows from the bottom of the hopper.

6 Claims, 5 Drawing Figures

LIQUEFYING HOT MELT ADHESIVE

This invention relates to a method of and apparatus for liquefying hot melt adhesive.

Generally hitherto, granules or chippings of the adhesive to be melted have been fed into a hopper and heated for the melted adhesive to flow from the bottom of the hopper, usually for further heating to the required temperature and pumping to one or more applicators of the hot melt adhesive. It has been preferred for only the lower region of the hopper to be heated, such that there is a layer of melted adhesive in this region but there is a substantial thickness of the solid granules or chippings above it: in this manner there is no exposed liquid surface and charring of the material is avoided. Although this has provided a satisfactory operation, the hot melt adhesive feedstock is expensive to produce in the required form of granules or chippings or small lumps.

In accordance with this invention, as seen from one aspect, there is provided a method of liquefying hot melt adhesive, comprising lowering a unitary mass of hot melt adhesive into a hopper until it is supported by one or more discrete, heated upwards projections within the hopper at a lower region thereof, which projections serve to melt the unitary mass progressively for the melted adhesive to flow from said lower region of the hopper. The cross-section of the unitary mass may correspond closely to that of the hopper into which it is lowered. Conveniently, the unitary mass may be contained in a drum which is itself a close fit within the vertical walls of the hopper, in which case the drum is inverted and then lowered into the hopper until the heated projection or projections directly support the mass of adhesive: the drum may come to rest with its inverted top rim supported by the hopper and with heat transmitted through the drum wall enabling the unitary mass of adhesive to slide progressively out of the drum as the melting and flow out of the hopper proceeds.

By use of the above method, very substantial savings in the costs of the feedstock can be made and there are also advantages in handling the feedstock. In particular, all that is necessary is the relatively infrequent supply to the hopper of the unitary mass of adhesive.

Also in accordance with this invention, as seen from a second aspect, there is provided an apparatus for liquefying hot melt adhesive, comprising a hopper, one or more discrete upwards projections within the hopper at a lower region thereof and serving to support a unitary mass of hot melt adhesive when lowered into the hopper, means for heating said projection or projections and at least one outlet for the melted adhesive to flow from said lower region of the hopper. Preferably the or each projection extends from the bottom wall of the hopper and upwards for 10% to 40% of the height of the hopper. In one particular arrangement, there is a single projection in the form of a fluted cone extending for substantially 25% of the height of the hopper.

Embodiments of this invention will now be described, by way of examples only, with reference to the accompanying drawings, in which.

Figure 1:
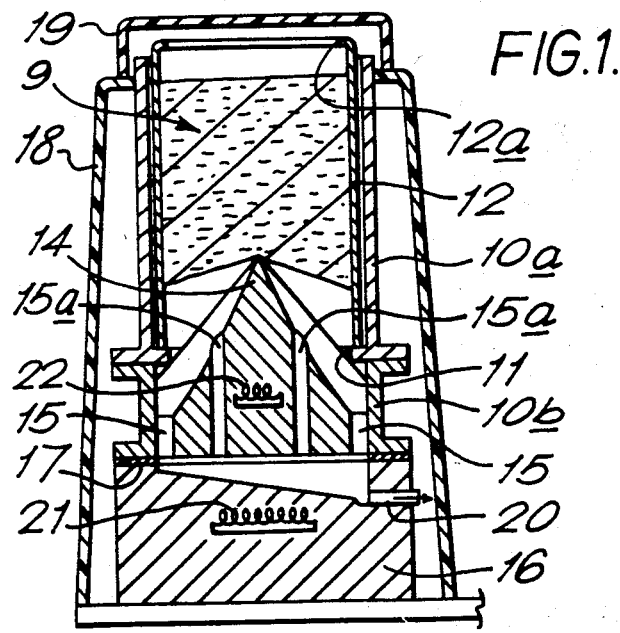
FIG. 1 is a diagrammatic vertical section through a hot melt adhesive liquefying apparatus showing, within a hopper of the apparatus, the rest position of a drum of adhesive.
Figure 2:
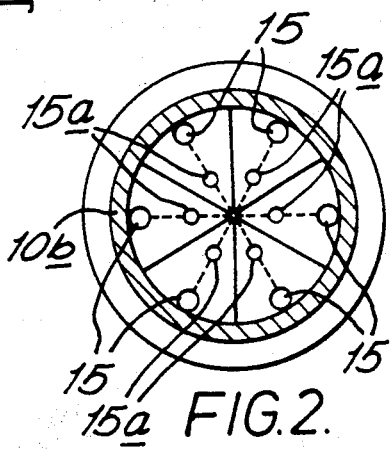
FIG. 2 is a view of the hopper from above when a cover of the hopper is removed.

Referring to FIGS. 1 and 2, there is shown a hot melt adhesive liquefying apparatus comprising a cylindrical hopper formed in two parts 10a, 10b, with an internal annulus 11 at the bottom of part 10a which serves to support the rim of a drum 12 when the latter comes to its rest position. The cylindrical shape of the hopper facilitates cleaning of its interior surface. The bottom wall of the hopper is formed with an upwardly projecting fluted cone 14, the valleys between the flutes leading downwards to passages 15 extending vertically through the bottom wall of the hopper (adjacent its cylindrical wall) to a drain which is provided, in the example shown, as a recess in the top of a high temperature block 16. Further vertical passages 15a are also formed through the cone, from the valleys between the flutes to the drain below, at points radially intermediate the cone apex and its periphery. A thermally insulating gasket 17 is disposed between the hopper and high temperature block 16, a fibreglass insulation jacket 18 surrounds the hopper and high temperature block 16, and a cover 19 is provided for the top of the hopper. A flow passage 20 extends through the block 16 from the drain recess, and serves to pass the melted adhesive to a pump (not shown). Electrical heating elements (indicated diagrammatically at 21, 22) are provided to heat the cone 14 and the block 16. Preferably the cone projects for 25% of the height of the hopper from the bottom wall.

In use, the feedstock for the apparatus may be supplied in cylindrical metal or fibre drums, such as that shown at 12, each drum being filled with a solid, unitary mass of hot melt adhesive. The top of the drum is removed and, with the hopper cover 19 also removed, the drum is inverted and lowered into the hopper until the tip of the cone directly supports the unitary mass of adhesive: the drum will at this initial time be supported (through the mass of adhesive) somewhat above the level shown, i.e. with its rim substantially at the level of the cone tip. It will be noted that the drum outer diameter is only slightly less than the hopper inner diameter. Heat from the cone causes a progressive melting of the solid adhesive, the melted adhesive flowing down the valleys between the flutes of the cone and then flowing through apertures 15, 15a into the drain. The solid mass of adhesive progressively descends, and with it the drum, until the drum rim rests on the annulus 11. Heat transmitted through the drum wall serves to at least soften the cylindrical surface of the solid mass of adhesive, such that it is able to slide progressively out of the drum as the melting continues: FIG. 1 shows the situation wherein the drum has come to rest with its rim on the annulus 11, and further wherein the solid mass 9 of adhesive has slid partially down the drum. It will be noted that it is necessary to provide an opening in the bottom of the drum, shown for example at 12a. Using the apparatus shown, it has been found practicable to melt two 45 gallon drums of solid adhesive per hour.

Instead of being supplied to the hopper within a drum, the feedstock may simply be placed in the hopper as a solid unitary mass, not necessarily of cylindrical shape.

Figure 3:
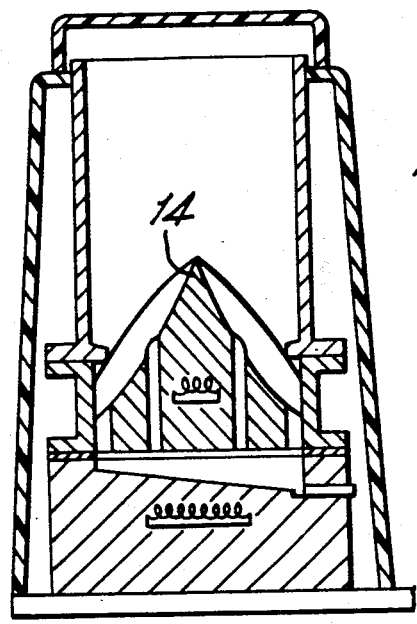
FIGS. 3 and 4 are views, similar to that of FIG. 1, through two apparatus with modified supporting projections for the adhesive.

In the modification shown in FIG. 3, the cone 14 is formed with flutes which are convex-profiled along their ridges, and concave-profiled along the roots of their intervening valleys.

Figure 4:
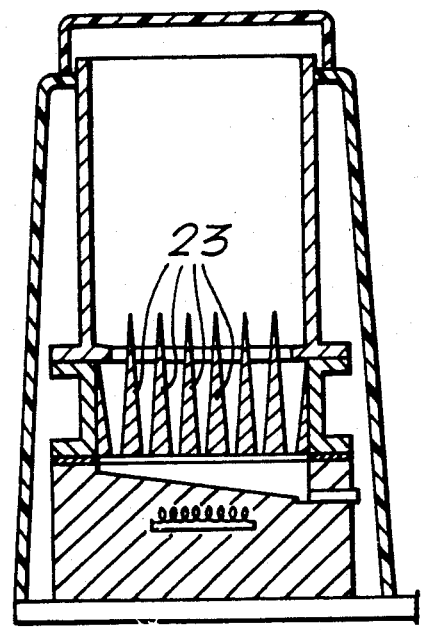

In the modification shown in FIG. 4, a plurality of discrete, equal-height and tapering projections 23 are provided in place of the cone 14.

Figure 5:
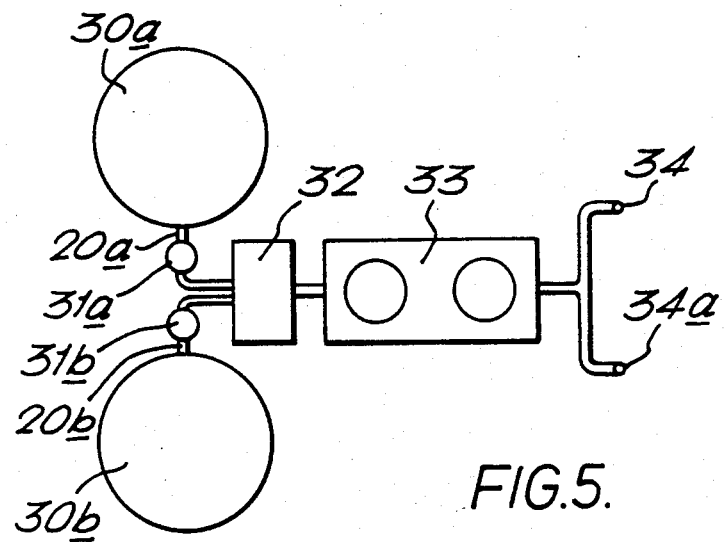
FIG. 5 is a schematic diagram of an arrangement utilising two liquefying apparatus and a common pumping system to one or more adhesive applicators, and facilitating a change-over from one type of adhesive to another.

FIG. 5 shows diagrammatically an arrangement which comprises two liquefying apparatus 30a, 30b, each as described above (although there may be more than two such apparatus), with their flow passages 20a, 20b connecting through valves 31a, 31b to a common gallery 32, from which a common pumping system 33 (comprising one or more gear pumps) delivers the melted adhesive to one or more adhesive applicator nozzles 34,34a. In normal operation, both hoppers would be in use with like adhesive and would be simultaneously supplying the melted adhesive through their open valves 31a, 31b. The arrangement however facilitates a change to a different type of adhesive, in which case the change-over procedure would be as follows. Firstly, the contents of one hopper (say hopper 30a) is allowed to drain completely, without adding further feedstock to it: then its valve 31a is closed and the different type of adhesive feedstock may be placed in the hopper 30a. Before valve 31a can be re-opened to commence use of the new type of adhesive, valve 31b of the other hopper must be closed and time allowed to drain its residual adhesive through the gallery 32 and pumping system 33. If it is required to use both hoppers simultaneously for the new type of adhesive, then the hopper 30b must be completely drained of the previous adhesive before valve 31a of hopper 30a can be opened. With the arrangement shown and the change-over procedures as described, the residual adhesive within the system after draining is minimal and does not significantly contaminate the newly-introduced adhesive.

I claim:

1. A method of liquefying hot melt adhesive, comprising upturning a cylindrical drum filled with a unitary mass of solidified adhesive, lowering the upturned drum into a closely fitting upright cylindrical hopper until it is supported by the mass of adhesive resting on a single, central, upwardly projecting cone in a lower region of the hopper, applying heat through the upright hopper wall and thus through the drum wall to the adhesive to preheat the latter, applying heat to the cone to progressively melt the adhesive, the adhesive and drum falling progressively under gravity alone, and causing the adhesive to flow out of said lower region of the hopper.

2. An apparatus for liquefying hot melt adhesive, the apparatus comprising a cylindrical hopper which is open at the top so as to receive within itself a closely fitting upturned cylindrical drum filled with a unitary mass of solidified adhesive, a single, central, upwardly projecting cone in a lower region of the hopper, serving to support the filled drum by the mass of adhesive resting on the cone tip, means for transmitting heat through the upright cylindrical wall of the hopper and through the drum wall to preheat the adhesive in the drum and means for heating the cone so that the adhesive liquefies progressively, from its surface resting on the cone, whilst the adhesive falls gradually under gravity alone, means around the interior wall of the hopper, and below the cone tip, for the rim of the drum to come to rest, and an outlet for the melted adhesive to flow from said lower region of the hopper.

3. An apparatus as claimed in claim 2, in which said cone is fluted.

4. An apparatus as claimed in clam 3, in which the cone is formed with passages for the melted adhesive, which passages extend downwardly from valleys between the flutes of the cone and are disposed adjacent the perhiphery of the cone.

5. An apparatus as claimed in claim 4, in which the cone is formed with further passages for the melted adhesive, said passages extending downwardly from the valleys between the flutes and positioned radially intermediate the cone apex and its periphery.

6. An arrangement comprising a plurality of apparatus each as claimed in claim 2, each apparatus having its said outlet connected through a respective valve to a common feed system serving at least one adhesive applicator.

* * * * *